(12) United States Patent
Taylor et al.

(10) Patent No.: US 8,010,535 B2
(45) Date of Patent: Aug. 30, 2011

(54) OPTIMIZATION OF DISCONTINUOUS RANK METRICS

(75) Inventors: Michael J. Taylor, Cambridge (GB); Stephen Robertson, London (GB); Thomas Minka, Cambridge (GB); John P. Guiver, Saffron Walden (GB)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 12/044,267

(22) Filed: Mar. 7, 2008

(65) Prior Publication Data

US 2009/0228472 A1 Sep. 10, 2009

(51) Int. Cl.
*G06F 17/30* (2006.01)

(52) U.S. Cl. ......... 707/748; 707/722; 707/736; 706/12

(58) Field of Classification Search .............. 707/748, 707/706, 723, 736; 706/12
See application file for complete search history.

(56) References Cited

U.S. PATENT DOCUMENTS

| | | | | |
|---|---|---|---|---|
| 6,654,742 B1 * | 11/2003 | Kobayashi et al. | .... | 707/999.003 |
| 6,701,312 B2 | 3/2004 | Lau et al. | | |
| 7,024,404 B1 * | 4/2006 | Gerasoulis et al. | .... | 707/999.003 |
| 7,257,577 B2 | 8/2007 | Fagin et al. | | |
| 7,895,206 B2 * | 2/2011 | Narayanan et al. | ........... | 707/737 |
| 2005/0060310 A1 | 3/2005 | Tong et al. | | |
| 2005/0065916 A1 | 3/2005 | Ge et al. | | |
| 2006/0074910 A1 * | 4/2006 | Yun et al. | ........... | 707/7 |
| 2007/0016574 A1 | 1/2007 | Carmel et al. | | |
| 2007/0038620 A1 | 2/2007 | Ka et al. | | |
| 2007/0038622 A1 | 2/2007 | Meyerzon et al. | | |
| 2007/0094171 A1 * | 4/2007 | Burges et al. | ........... | 706/16 |
| 2007/0239702 A1 * | 10/2007 | Vassilvitskii et al. | ........... | 707/5 |
| 2007/0288438 A1 | 12/2007 | Epstein | | |
| 2008/0010281 A1 * | 1/2008 | Berkhin et al. | ........... | 707/7 |
| 2008/0027936 A1 * | 1/2008 | Liu et al. | ........... | 707/7 |
| 2009/0125498 A1 * | 5/2009 | Cao et al. | ........... | 707/5 |

FOREIGN PATENT DOCUMENTS

EP 1006458 6/2000

OTHER PUBLICATIONS

Agichtein, et al., "Improving Web Search Ranking by Incorporating User Behavior Information", ACM, 2006, pp. 8.
Balakrishnan, et al., "Polynomial Approximation Algorithms for Belief Matrix Maintenance in Identity Management", Dept. of Aeronautics and Astronautics, Stanford University, pp. 8.

(Continued)

*Primary Examiner* — Rehana Perveen
*Assistant Examiner* — Thuy (Tiffany) Bui
(74) *Attorney, Agent, or Firm* — Lee & Hayes, PLLC

(57) ABSTRACT

Methods to enable optimization of discontinuous rank metrics are described. The search scores associated with a number of search objects are written as score distributions and these are converted into rank distributions for each object in an iterative process. Each object is selected in turn and the score distribution of the selected object is compared to the score distributions of each other object in turn to generate a probability that the selected object is ranked in a particular position. For example, with three documents the rank distribution may give a 20% probability that a document is ranked first, a 60% probability that the document is ranked second and a 20% probability that the document is ranked third. In some embodiments, the rank distributions may then be used in the optimization of discontinuous rank metrics.

9 Claims, 12 Drawing Sheets

OTHER PUBLICATIONS

Burges, et al., "Learning to Rank using Gradient Descent", Proceedings of the 22nd International Conference on Machine Learning, Bonn, Germany, 2005, pp. 8.

Burges, at al., "Learning to Rank with Nonsmooth Cost Functions", <<http://research.microsoft.com/~cburges/papers/LambdaRank.pdf>>, pp. 8.

Cao, et al., "Learning to Rank: From Pairwise Approach to Listwise Approach", ICML, 2007, pp. 9.

Caruana, at al., "Using the Future to "Sort Out" the Present: Rankprop and Multitask Learning for Medical Risk Evaluation", <<http://www.cs.cmu.edu/afs/cs/project/theo-11/www/nips95.ps>>, pp. 7.

Chu, et al., "Gaussian Processes for Ordinal Regression", Wei Chu and Zoubin Ghahramani, 2005, pp. 1019-1041.

Crammer, et al., "Pranking with Ranking", <<http://citeseer.ist.psu.edu/cache/papers/cs/26676/http:zSzzSzwww-2.cs.cmu.eduzSzGroupszSzNIPSzSzNIPS2001zSzpaperszSzpsgzzSzAA65.pdf/crammer01pranking.pdf>>, pp. 7.

Diaz, "Regularizing Ad Hoc Retrieval Scores", ACM, 2005, pp. 8.

Herbrich, et al., "Large Margin Rank Boundaries for Ordinal Regression" <<http://research.microsoft.com/~rherb/papers/herobergrae99.ps.gz,>>, pp. 116-132.

Jarvelin, et al., "IR Evaluation Methods for Retrieving Highly Relevant Documents", ACM, 2000, pp. 41-48.

Joachims, "Optimizing Search Engines using Click through Data", ACM, 2002, pp. 10.

LeCun, et al., "Efficient BackProp" Springer, 1998, pp. 44.

Metzler, et al., "Lessons Learned From Three Terabyte Tracks", University of Massachusetts, pp. 4.

Robertson, et al., "On Rank-Based Effectiveness Measures and Optimization", Information Retrieval, vol. 10, 2007, pp. 1-28.

Robertson, et al., "Simple BM 25 Extension to Multiple Weighted Fields", Microsoft Research,, pp. 8.

Snelson, et al., "Soft Rank with Gaussian Processes", Microsoft Research, 2007, pp. 8.

Taylor, et al., "Optimization Methods for Ranking Functions with Multiple Parameters", ACM, 2006, pp. 9.

Taylor, et al., "Soft Rank; Optimising Non-Smooth Rank Metrics", ACM, 2000, pp. 10.

Zhai, et al., "A Study of Smoothing Methods for Language Models Applied to Ad Hoc Information Retrieval", ACM, 2001, pp. 9.

\* cited by examiner

OPTIMIZATION OF DISCONTINUOUS RANK METRICS

BACKGROUND

Information retrieval systems, such as internet search systems, use ranking functions to generate document scores which are then sorted to produce a ranking. Typically these functions have had only a small number of free parameters (e.g. two free parameters in BM25) and as a result they are easy to tune for a given collection of documents (or other search objects), requiring few training queries and little computation to find reasonable parameter settings.

These functions typically rank a document based on the occurrence of search terms within a document. More complex functions are, however, required in order to take more features into account when ranking documents, such as where search terms occur in a document (e.g. in a title or in the body of text), link-graph features and usage features. As the number of functions is increased, so is the number of parameters which are required. This increases the complexity of learning the parameters considerably.

Machine learning may be used to learn the parameters within a ranking function (which may also be referred to as a ranking model). The machine learning takes an objective function and optimizes it. There are many known metrics which are used to evaluate information retrieval systems, such as Normalized Discounted Cumulative Gain (NDCG), Mean Average Precision (MAP) and RPrec (Precision at rank R, where R is the total number of relevant documents), all of which only depend on ranks of documents and as a result are not suitable for use as test objectives. This is because the metrics are not smooth with respect to the parameters within the ranking function (or model): if small changes are made to the model parameters, the document scores will change smoothly; however, this will typically not affect the ranking of the documents until one document's score passes another and at which point the information retrieval metric will make a discontinuous change.

The embodiments described below are not limited to implementations which solve any or all of the disadvantages of known information retrieval systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods to enable optimization of discontinuous rank metrics are described. The search scores associated with a number of search objects are written as score distributions and these are converted into rank distributions for each object in an iterative process. Each object is selected in turn and the score distribution of the selected object is compared to the score distributions of each other object in turn to generate a probability that the selected object is ranked in a particular position. For example, with three documents the rank distribution may give a 20% probability that a document is ranked first, a 60% probability that the document is ranked second and a 20% probability that the document is ranked third. In some embodiments, the rank distributions may then be used in the optimization of discontinuous rank metrics.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
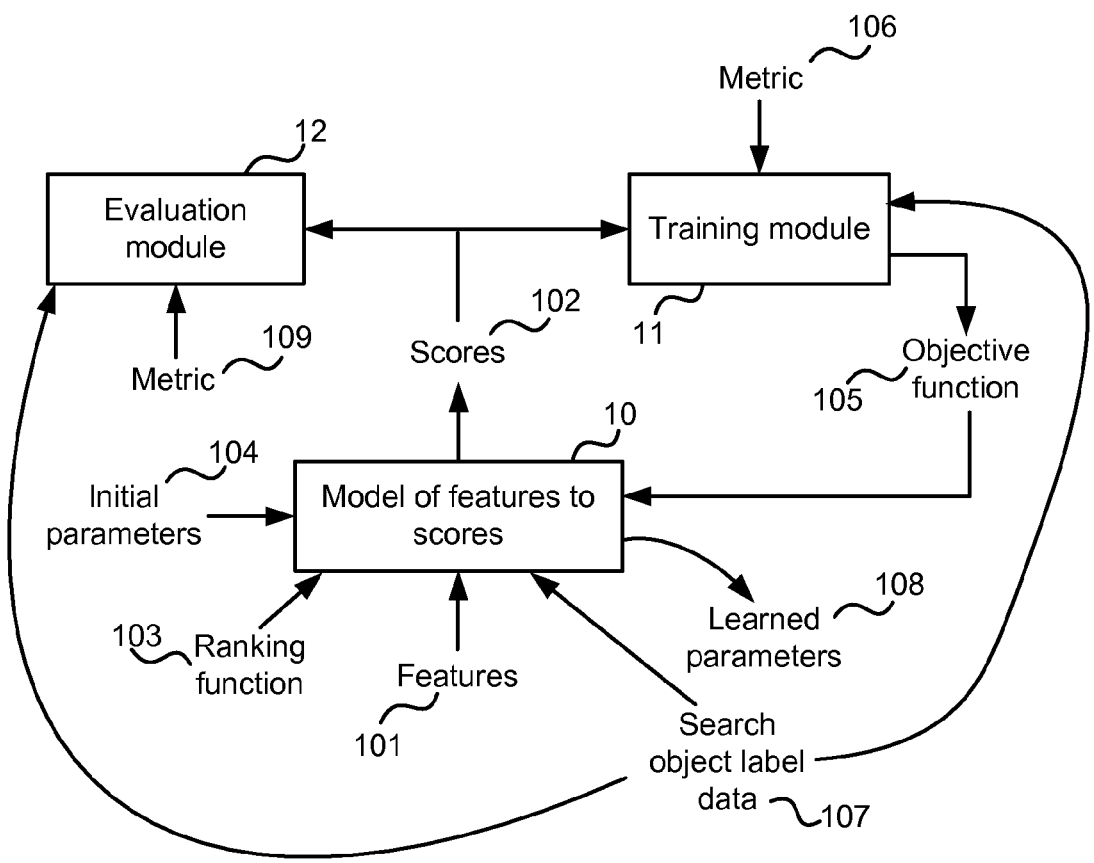
FIG. 1 is a schematic diagram of a system for learning the parameters for a ranking function.

FIG. 1 is a schematic diagram of a system for learning the parameters for a ranking function. A model 10 is used to model the mapping between features 101 of search objects (such as documents) and scores 102 for those objects. In an example, a neural net model (e.g. a 2-layer neural net model) may be used. Neural nets are established machine learning techniques which scale well with large amounts of training data, but are only one example of a suitable model. The ranking function 103 and initial values of its parameters 104 are input to the model. The parameters, which may also be referred to as weights, may initially be set to random values near zero. Where a neural net is used as the model 10, the input features 101 may be normalized so that they have a mean of zero and a standard deviation of one over the training set queries.

The scores 102 which are generated by the model 10 and label data 107 (or other data which indicates the relevance of each search object to a particular search query) are input to a training module 11 which generates an objective function 105 based on an information retrieval metric 106. For the purposes of the following explanation, NDCG is used as the information retrieval metric 106. However, other metrics may alternatively be used, such as Average Precision. The generation of the objective function 105 is described in more detail below. The label data 107 may be generated by judges who assign relevance levels to documents for a particular search query. In an example, gradient based learning may be used.

The model 10 uses the objective function 105 to optimize the values of the parameters in the ranking function 103. The optimization uses label data 107 for the particular search objects or other data which indicates the relevance of each search object to a particular search query. The model 10 outputs a set of learned parameters 108, which may be based on many iterations (as described below) and on a number of different training queries. The learned parameters 108 and the ranking function 103 may then be used in a search tool (i.e. the above method is performed off-line and therefore the computation time in learning the parameters does not affect the speed of searching). Different learned parameters may be generated for different collections of search objects or an existing set of learned parameters may be used on a new collection of search objects. A collection of search objects is also known as a corpus.

In addition to inputting the scores 102 to a training module 11, the scores may also be input to an evaluation module 12 which uses an information retrieval metric 109 and the label data 107 to evaluate the effectiveness of the ranking function 103 (including the current values of the parameters). The metrics 106, 109 used for training and evaluation may be the same or different. In some examples, a first set of search objects may be used for training and a second set of search objects may be used for evaluation.

Figure 2:
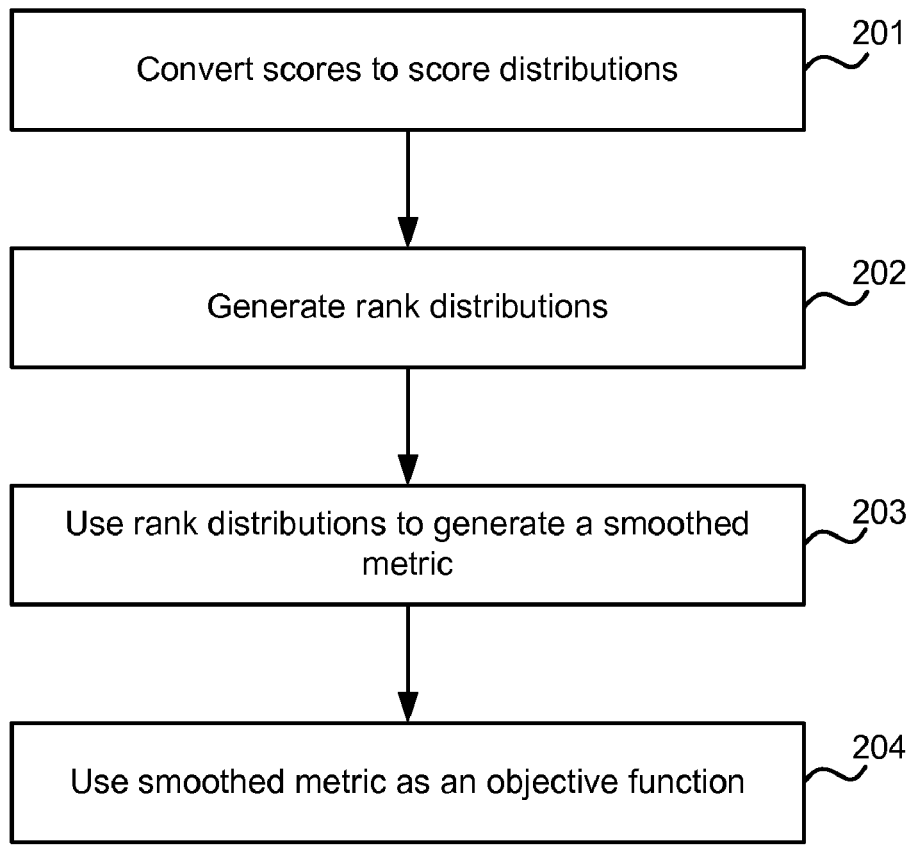
FIG. 2 shows a flow diagram of an example method of generating an objective function.

FIG. 2 shows a flow diagram of an example method of generating an objective function (e.g. as performed in the training module 11 in the system shown in FIG. 1). Where the scores 102 output by the model are deterministic, these are converted to score distributions (block 201). If the model outputs scores as probabilistic values (such as when using a Gaussian Process model) this method block may be omitted. The score distributions (which may have been generated in block 201) are used to generate rank distributions (block 202) which can then be substituted into an information retrieval metric 106, such as NDCG, to generate a smoothed metric (block 203). This smoothed metric can be used as an objective function 105 in order to learn the parameters 108 in a ranking function 103 (block 204). These method blocks are described in more detail below.

For the purposes of the following explanation the following notation is used: for a given training query, it is assumed that there are N documents, each with a known human-defined rating (label data 107) and an individual document indexed by j is denoted as $doc_j$. A ranking function f with weights (parameters) w is assumed to take in document features $x_j$ and produces a score $s_j$. The score is denoted:

$$s_j = f(w, x_j) \quad (1)$$

It will be appreciated that a search may be for items other than documents, such as images, sound files etc, however, for the purposes of the following explanation only, the search objects are referred to as documents.

The conversion (in block 201) of deterministic scores to smoothed scores (or score distributions) may be performed by treating them as random variables. Each score may be given the same smoothing using equal variance Gaussian distributions. Hence the deterministic score $s_j$ in equation (1) becomes the mean of a Gaussian score distribution, with a shared smoothing variance $\sigma_s$:

$$p(s_j) = N(s_j | \bar{s}_j, \sigma_s^2) = N(s_j | f(w, x_j), \sigma_s^2) \quad (2)$$

Using:

$$N(x | \mu, \sigma^2) = (2\pi\sigma^2)^{-0.5} \exp[-(x-\mu)^2/2\sigma^2]$$

Figure 3:
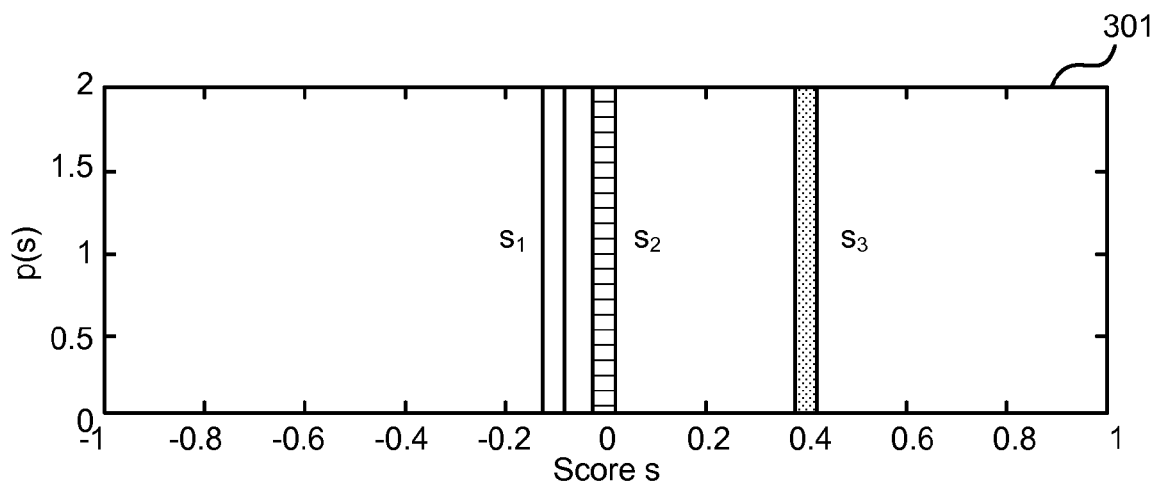
FIG. 3 shows two example graphs showing three search object scores.
Figure 3:
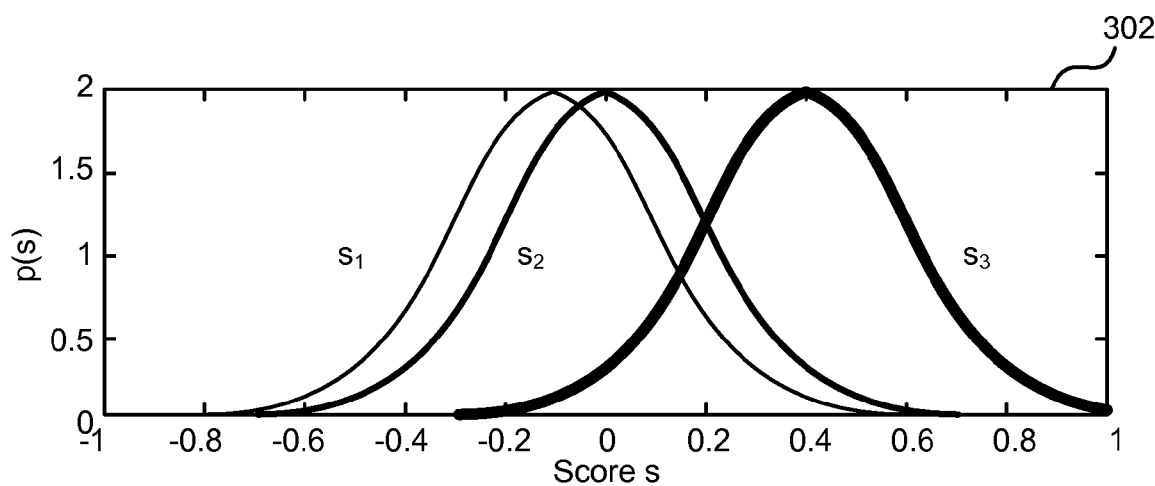

An alternative motivation would be to consider the source of noise as an inherent uncertainty in the model parameters w, arising from inconsistency between the ranking model and the training data. This would be the result of a Bayesian approach to the learning task. FIG. 3 shows two example graphs showing three search object scores, $s_1$, $s_2$, $s_3$ as deterministic values in graph 301 and as smoothed values in graph 302.

Figure 4:
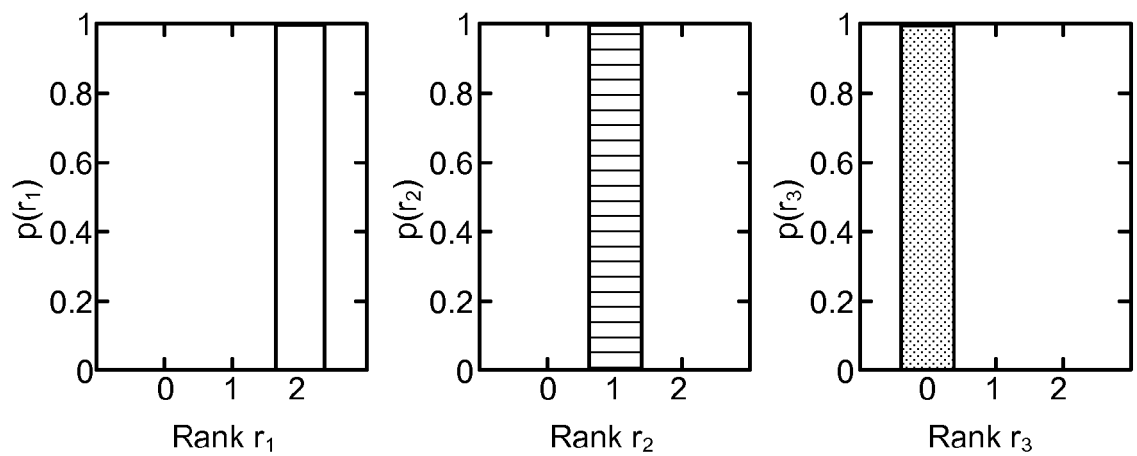
FIG. 4 shows three example graphs showing rank distributions generated from deterministic scores.

Deterministic scores, as shown in graph 301, result in deterministic rank distributions, as shown in FIG. 4. One method of generating the rank distributions for smoothed scores, as shown in graph 302, is to:

a) sample a vector of N scores, one from each score distribution,
b) sort the score samples and
c) accumulate histograms of the resulting ranks for each document.

However, the use of sorting (in step b) results in a discontinuous function which causes problems for gradient based optimizations.

Figure 5:
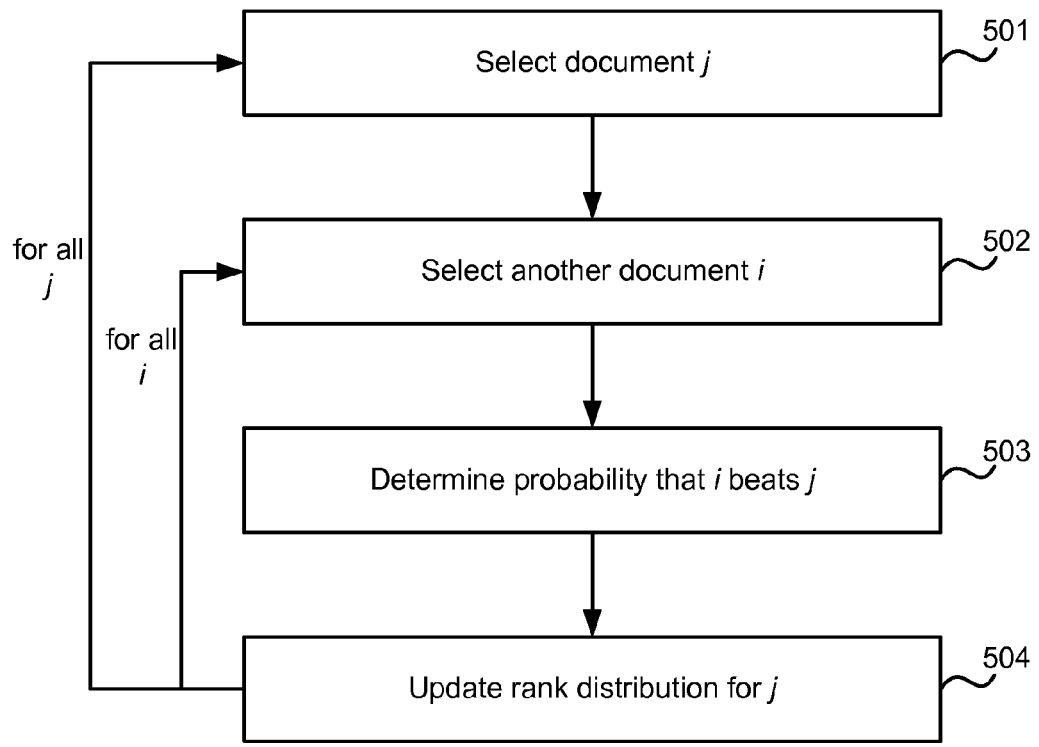
FIG. 5 shows a flow diagram of an example method of generating a rank distribution.

Alternatively, an approximate algorithm for generating the rank distributions may be used that avoids an explicit sort, as shown in FIG. 5. A document j is selected (block 501), and with one document, the probability of it having rank zero (the best rank) is one. This document j may be referred to as the 'anchor document'. Another document i is selected (block 502) and a pairwise comparison is performed between documents j and i to determine the probability that document i beats document j (block 503). Based on the outcome of the pairwise comparison (in block 503), the rank distribution for document j is updated (block 504), where the rank distribution is the probability that the document j occupies each of the ranks (e.g. for two documents, the probability of having rank zero and the probability of having rank one). The process is then repeated (blocks 502-504) adding another document ion each iteration, to determine the full rank distribution for document j (i.e. for ranks 0 to N−1). The process is then repeated (blocks 501-504) with each other document in turn as anchor document, to determine the full rank distributions for each of the N documents. This method is described further below.

For a given $doc_j$ (selected in block 501), the probability that another $doc_i$ (selected in block 502) will rank above $doc_j$ is determined (in block 503). Denoting $S_j$ as a draw (i.e. a sampled selection) from $p(s_j)$, the probability that $S_i > S_j$ is required, or equivalently $Pr(S_i - S_j > 0)$. Therefore the required probability is the integral of the difference of two Gaussian random variables, which is itself a Gaussian, and therefore the probability that document i beats document j, which is denoted $\pi_{ij}$, is:

$$\pi_{ij} \equiv Pr(S_i - S_j > 0) = \int_0^\infty \mathcal{N}(s | \bar{s}_i - \bar{s}_j, 2\sigma_s^2) ds. \quad (3)$$

This quantity represents the fractional number of times that $doc_i$ would be expected to rank higher than $doc_j$ on repeated pairwise samplings from the two Gaussian score distributions. For example, referring to FIG. 3 graph 302, it would be expected that $\pi_{32} > \pi_{12}$. In other words, if two pairs $\{S_1, S_2\}$ and {$S_3,S_2$} are drawn, $S_3$ is more likely to win its pairwise contest against $S_2$ than $S_1$ is in its contest.

Figure 6:
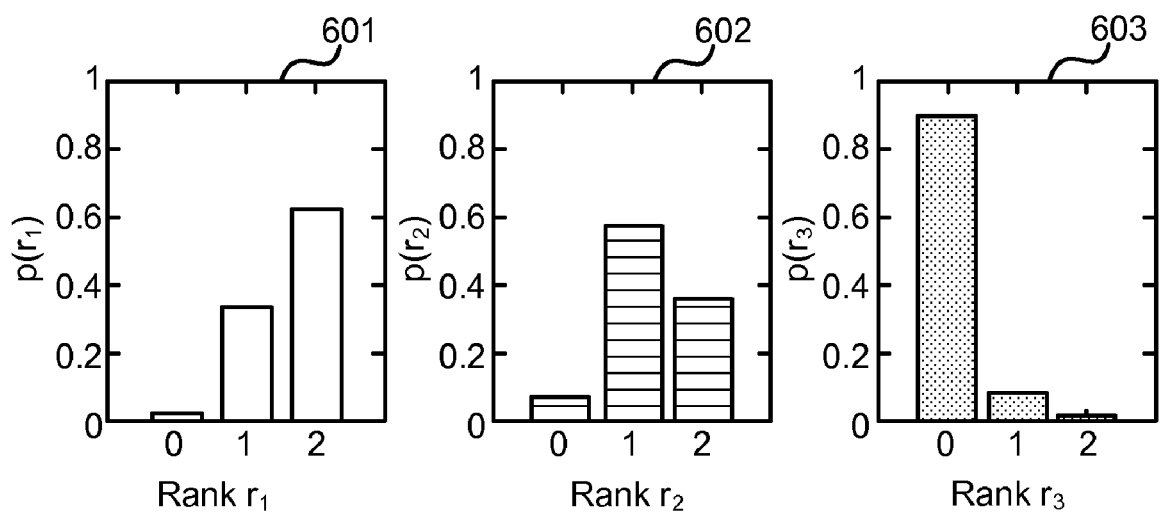
FIG. 6 shows three example graphs showing rank distributions generated from smoothed scores.

These pairwise probabilities may then be used to generate ranks (in block 504). If the probabilities of a document being beaten by each of the other documents were added up, this would give a quantity that is related to the expected rank of the document being beaten, i.e. if a document is never beaten, its rank will be 0, the best rank. More generally, using the pairwise contest trick, an expression for the expected rank $r_j$ of document j can be written as:

$$E[r_j] = \sum_{i=1, i \neq j}^{N} \pi_{ij} \qquad (4)$$

which can be easily computed using equation (3). As an example, FIG. 6 shows what happens to the rank distributions when the scores are smoothed (as shown in FIG. 3): the expected rank of document 3 is between 0 (best) and 1, as shown in graph 603, and documents 1 and 2 have an expected rank between 1 and 2 (worst), as shown in graphs 601 and 602.

The actual distribution of the rank $r_j$ of a document j under the pairwise contest approximation is obtained by considering the rank $r_j$ as a Binomial-like random variable, equal to the number of successes of N−1 Bernoulli trials, where the probability of success is the probability that document j is beaten by another document i, namely $\pi_{ij}$. If i beats j then $r_j$ goes up by one.

However, because the probability of success is different for each trial, it is a more complex discrete distribution than the Binomial: it is referred to herein as the Rank-Binomial distribution. Like the Binomial, it has a combinatoric flavour: there are few ways that a document can end up with top (and bottom) rank, and many ways of ranking in the middle. Unlike the Binomial, it does not have an analytic form. However, it can be computed using a standard result from basic probability theory, that the probability density function (pdf) of a sum of independent random variables is the convolution of the individual pdfs. In this case it is a sum of N independent Bernoulli (coin-flip) distributions, each with a probability of success $\pi_{ij}$. This yields an exact recursive computation for the distribution of ranks as follows.

If the initial rank distribution for document j is defined as $p_j^{(1)}(r)$, where the superscript number identifies the stage of recursion and there is just the document j, then the rank can only have value zero (the best rank) with probability one:

$$p_j^{(1)}(r) = \delta(r) \qquad (5)$$

where $\delta(x)=1$ only when x=0 and zero otherwise. There are N−1 other documents that contribute to the rank distribution and these may be indexed with i=2 . . . N. Each time a new document i is added, the event space of the rank distribution gets one larger, taking the r variable to a maximum of N−1 on the last iteration. The new distribution over the ranks is updated by applying the convolution process described above, giving the following recursive relation:

$$p_j^{(i)}(r) = p_j^{(i-1)}(r-1)\pi_{ij} + p_j^{(i-1)}(r)(1-\pi_{ij}). \qquad (6)$$

The recursive relation shown in equation (6) can be interpreted in the following manner. If document i is added, the probability of rank $r_j$ can be written as a sum of two parts corresponding to the new document i beating document j or not. If i beats j then the probability of being in rank r at this iteration is equal to the probability of being in rank r−1 on the previous iteration, and this situation is covered by the first term on the right of equation (6). Conversely, if the new document leaves the rank of j unchanged (it loses), the probability of being in rank r is the same as it was in the last iteration, corresponding to the second term on the right of equation (6).

If $r_j<0$, then $p_j^{(i)}(r)$ is defined as $p_j^{(i)}(r)=0$. The final rank distribution is defined as $p_j(r)=p_j^{(N)}(r)$. FIG. 6 shows these distributions for the simple 3 score case.

Figure 7:
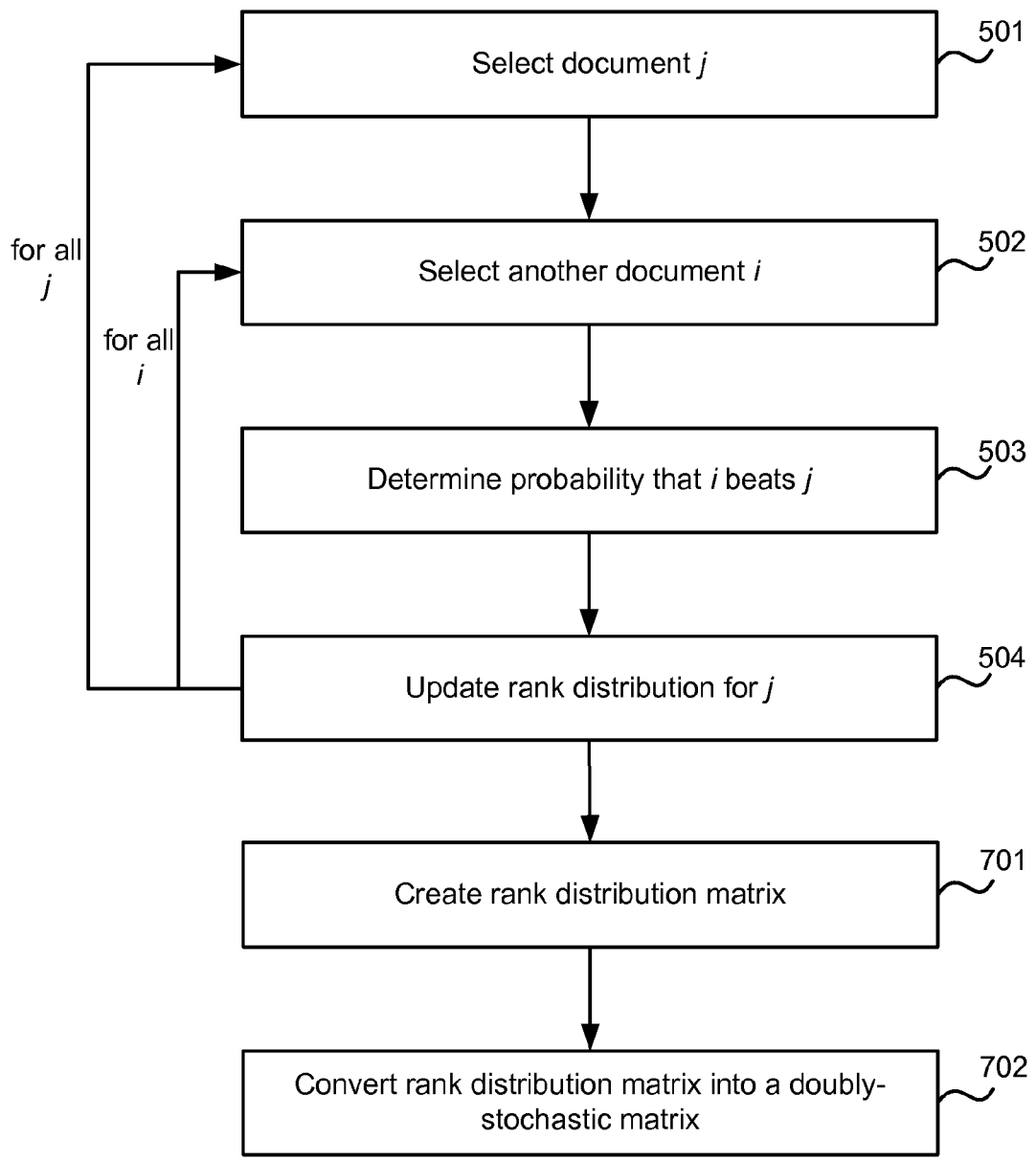
FIG. 7 shows a flow diagram of another example method of generating a rank distribution.

The pairwise contest trick yields Rank-Binomial rank distributions, which are an approximation to the true rank distributions. Their computation does not require an explicit sort. Simulations have shown that this gives similar rank distributions to the true generative process. These approximations can, in some examples, be improved further as shown in FIG. 7. The rank distribution matrix, or [$p_j(r)$] matrix is generated (block 701):

$$\begin{pmatrix} p_1^{(N)}(r) \\ p_2^{(N)}(r) \\ \ldots \\ \ldots \\ p_N^{(N)}(r) \end{pmatrix}$$

A sequence of column and row operations are then performed on this matrix (block 702). The operations comprise dividing each column by the column sums, then dividing each row of the resulting matrix by the row sums, and iterating to convergence. This process is known as Sinkhorn scaling, its purpose being to convert the original matrix to a doubly-stochastic matrix. The solution can be shown to minimize the Kullback-Leibler distance of the scaled matrix from the original matrix.

Having generated the rank distributions (block 202, FIGS. 5-7), these distributions can be used to smooth information retrieval metrics by taking the expectation of the information retrieval metric with respect to the rank distribution. This is described in more detail below using NDCG as an example metric.

NDCG is a metric which is a reasonable way of dealing with multiple relevance levels in datasets. It is often truncated at a rank position R (indexed from 0, e.g. R=10) and is defined as:

$$G_R = G_{R,max}^{-1} \sum_{r=0}^{R-1} g(r) D(r) \qquad (7)$$

where the gain g(r) of the document at rank r is usually an exponential function $g(r)=2^{l(r)}$ of the labels l(r) (or ratings) of the document at rank r. The labels identify the relevance of a particular document to a particular search query and typically take values from 0 (bad) to 4 (perfect). The rank discount D(r) has the effect of concentrating on documents with high scores and may be defined in many different ways, and for the purposes of this description D(r)=1/log(2+r). $G_{R,max}$ is the maximum value of $$\sum_{r=0}^{R-1} g(r) D(r)$$

obtained when the documents are optimally ordered by decreasing label value and is a normalization factor. Where no subscript is defined, it should be assumed that R=N.

The expression for deterministic NDCG is given in equation (7). Based on this expression, the expected NDCG can be computed given the rank distributions described above. Rewriting NDCG as a sum over document indices j rather than document ranks r gives:

$$G = G_{max}^{-1} \sum_{j=1}^{N} g(j) D(r_j) \qquad (8)$$

The deterministic discount D(r) is replaced by the expected discount $E[D(r_j)]$, giving:

$$G_{soft} = G_{max}^{-1} \sum_{j=1}^{N} g(j) E[D(r_j)] \qquad (9)$$

This is referred to herein as 'SoftNDCG'.

Figure 8:
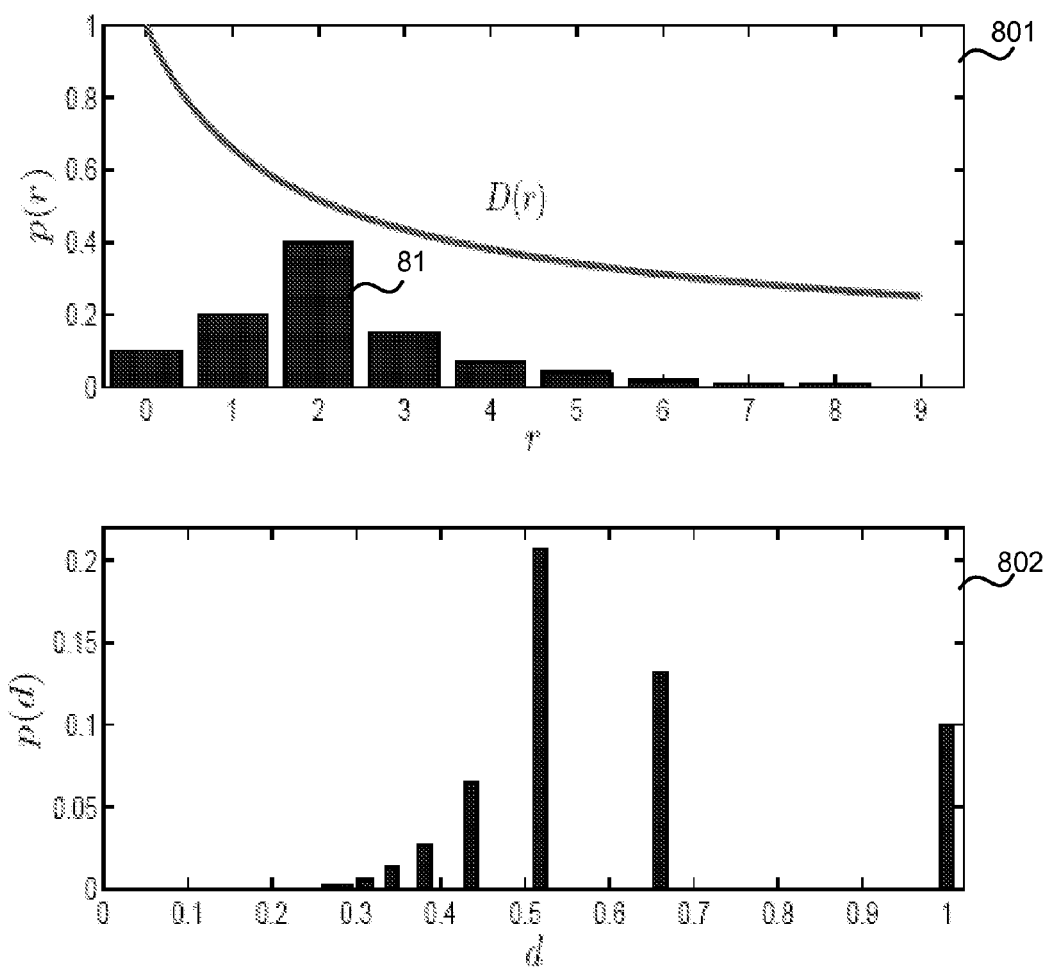
FIG. 8 shows the mapping of the rank distribution through a non-linear discount function to a discrete distribution over discounts.

FIG. 8 shows the mapping of the rank distribution 81 (shown in graph 801) through the non-linear discount function D(r), to a discrete distribution over discounts p(d), as shown in graph 802. This gives:

$$G_{soft} = G_{max}^{-1} \sum_{j=1}^{N} g(j) \sum_{r=0}^{N-1} D(r) p_j(r) \qquad (10)$$

where the rank distribution $p_j(r)$ is given in equation (6) above. The variable $G_{soft}$ provides a single value per query, which may be averaged over several queries, and which evaluates the performance of the ranking function. The equation (10) may then be used as an objective function to learn parameters (in block 204 of FIG. 2).

Figure 9:
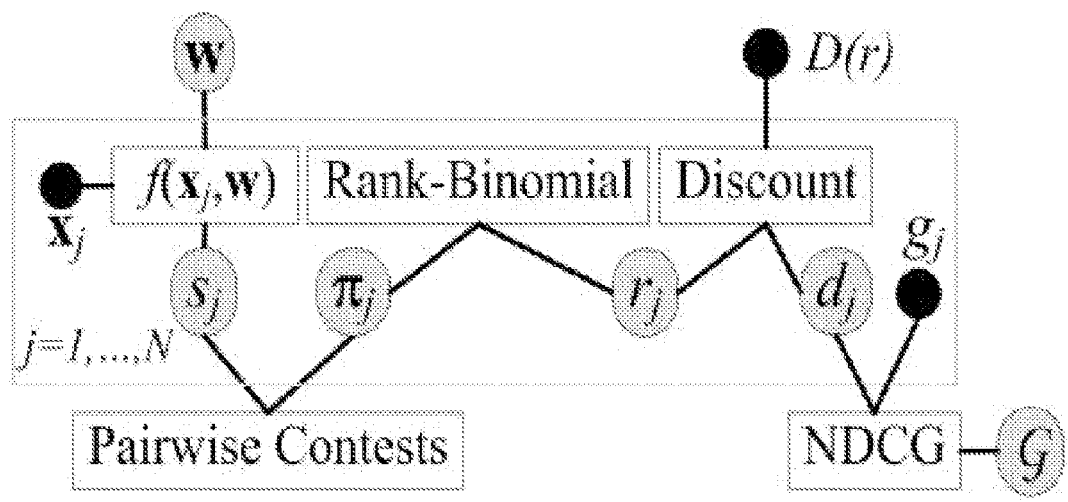
FIG. 9 shows a factor graph of the distributions for a query.

FIG. 9 shows a factor graph of the distributions for a query. Gaussian scores $s_j$ map to Bernoulli vectors $\pi_j$ which provide the success probabilities for the computation of the Rank-Binomials over ranks $r_j$ for each document 1 ... N. Then the rank distributions get mapped in a non-linear way through the discount function D(r) to give a distribution over discounts $d_j$. Finally, combining the expected discount with the gain of the label over all documents, the expected SoftNDCG, $G_{soft}$ is obtained.

The use of SoftNDCG to learn parameters is described below using one particular learning method. It will be appreciated that the objective function given above in equation (10) may be used in other ways to learn the parameters in a ranking function.

Having derived an expression for a SoftNDCG, it is differentiated with respect to the weight vector, w. The derivative with respect to the weight vector with K elements is:

$$\frac{\partial G_{soft}}{\partial w} = \begin{bmatrix} \frac{\partial s_1}{\partial w_1} & \cdots & \frac{\partial s_N}{\partial w_n} \\ \cdots & \cdots & \cdots \\ \frac{\partial s_1}{\partial w_K} & \cdots & \frac{\partial s_N}{\partial w_K} \end{bmatrix} \begin{bmatrix} \frac{\partial G_{soft}}{\partial \bar{s}_1} \\ \cdots \\ \frac{\partial G_{soft}}{\partial \bar{s}_N} \end{bmatrix}. \qquad (11)$$

The first matrix is defined by the neural net model and is computed via backpropagation (e.g. as described in a paper by Y. LeCun et al entitled 'Efficient Backprop' published in 1998). The second vector is the gradient of the objective function (equation (10)) with respect to the score means, s. The task is to define this gradient vector for each document in a training query.

Taking a single element of this gradient vector corresponding to a document with index m ($1 \leq m \leq N$), equation (10) can be differentiated to obtain:

$$\frac{\partial G_{soft}}{\partial \bar{s}_m} = G_{max}^{-1} \sum_{j=1}^{N} g(j) \sum_{r=0}^{N-1} D(r) \frac{\partial p_j(r)}{\partial \bar{s}_m}. \qquad (12)$$

This says that changing score $\bar{s}_m$ affects $G_{soft}$ via potentially all the rank distributions, as moving a score will affect every document's rank distribution. The resultant change in each rank distribution will induce a change in the expected gain for each document determined by the nonlinear discount function D(r).

Hence a parallel recursive computation is used to obtain the required derivative of $p_j(r)$. Denoting $$\psi_{m,j}^{(i)}(r) = \frac{\partial p_j^{(i)}(r)}{\partial \bar{s}_m}$$

it can be shown from equation (7) that:

$$\psi_{m,j}^{(1)}(0) = 0 \qquad (13)$$

$$\psi_{m,j}^{(i)}(r) =$$

$$\psi_{m,j}^{(i-1)}(r-1)\pi_{ij} + \psi_{m,j}^{(i)}(r)(1-\pi_{ij}) + (p_j^{(i-1)}(r-1) - p_j^{(i-1)}(r))\frac{\partial \pi_{ij}}{\partial \bar{s}_m}$$

where the recursive process runs i=1 ... N. Considering now the last term on the right of equation (13), differentiating $\pi_{ij}$ with respect to $\bar{s}_m$ using equation (3) yields three different cases, (given that i≠j and so m=i=j is not possible). Using the fact that:

$$\frac{\partial}{\partial \mu} \int_0^{\infty} \mathcal{N}(x \mid \mu, \sigma^2) dx = \mathcal{N}(0 \mid \mu, \sigma^2) \qquad (14)$$

it can be shown from equation (3) that:

$$\frac{\partial \pi_{ij}}{\partial \bar{s}_m} = \begin{cases} \mathcal{N}(x \mid \bar{s}_m - \bar{s}_j, 2\sigma_s^2) & m = i, m \neq j \\ -\mathcal{N}(x \mid \bar{s}_m - \bar{s}_j, 2\sigma_s^2) & m \neq i, m = j \\ 0 & m = i, m = j \end{cases} \qquad (15)$$

and so substituting equation (15) in equation (13), the recursion for the derivatives can be run. The result of this computation can be defined as the N-vector over ranks:

$$\frac{\partial p_j(r)}{\partial \bar{s}_m} \equiv \psi_{m,j} = [\psi_{m,j}^{(N)}(0), \ldots, \psi_{m,j}^{(N)}(N-1)]. \quad (16)$$

Using this matrix notation, the result can be substituted in equation (12):

$$\frac{\partial G_{soft}}{\partial \bar{s}_m} = \frac{1}{G_{max}}[g_1, \ldots, g_N]\begin{bmatrix} \psi_{m,0} \\ \ldots \\ \psi_{m,N-1} \end{bmatrix}\begin{bmatrix} d_0 \\ \ldots \\ d_{N-1} \end{bmatrix}. \quad (17)$$

The following are now defined: the gain vector g (by document), the discount vector d (by rank) and the N×N square matrix $\Psi_m$ whose rows are the rank distribution derivatives implied above:

$$\frac{\partial G_{soft}}{\partial \bar{s}_m} = \frac{1}{G_{max}} g^T \psi_m d. \quad (18)$$

So to compute the N-vector gradient of $G_{soft}$ which is defined as:

$$\nabla G_{soft} = \left[\frac{\partial G_{soft}}{\partial \bar{s}_1}, \ldots, \frac{\partial G_{soft}}{\partial \bar{s}_N}\right]$$

the value of $\Psi_m$ is computed for each document.

For a given query of N documents, calculation of the $\pi_{ij}$ is $O(N^2)$, calculation of all the $p_j(r)$ is $O(N^3)$, and calculation of the SoftNDCG is $O(N^2)$. Similar complexity arises for the gradient calculations. So the calculations are dominated by the recursions in equations (6) and (13).

A substantial computational saving can be made by approximating all but a few of the Rank-Binomial distributions. The motivation for this is that a true binomial distribution, with N samples and probability of success π, can be approximated by a normal distribution with mean Nπ and variance Nπ(1−π) when Nπ is large enough. For the rank binomial distribution, π is not constant, but simulations confirm that it can be approximated similarly, for a given j, by a normal distribution with mean equal to the expected rank $$\sum_{i=1, i\neq j}^{N} \pi_{ij}$$

and variance equal to $$\sum_{i=1, i\neq j}^{N} \pi_{ij}(1-\pi_{ij}).$$

As the approximation is an explicit function of the $\pi_{ij}$, the gradients of the approximated $p_j(r)$ with respect to $\pi_{ij}$ can be calculated and therefore they can also be calculated with respect to the $\bar{s}_m$. Using this approximation enables the expensive recursive calculations to be restricted to a few documents at the top and bottom of the ranking.

Figure 10:
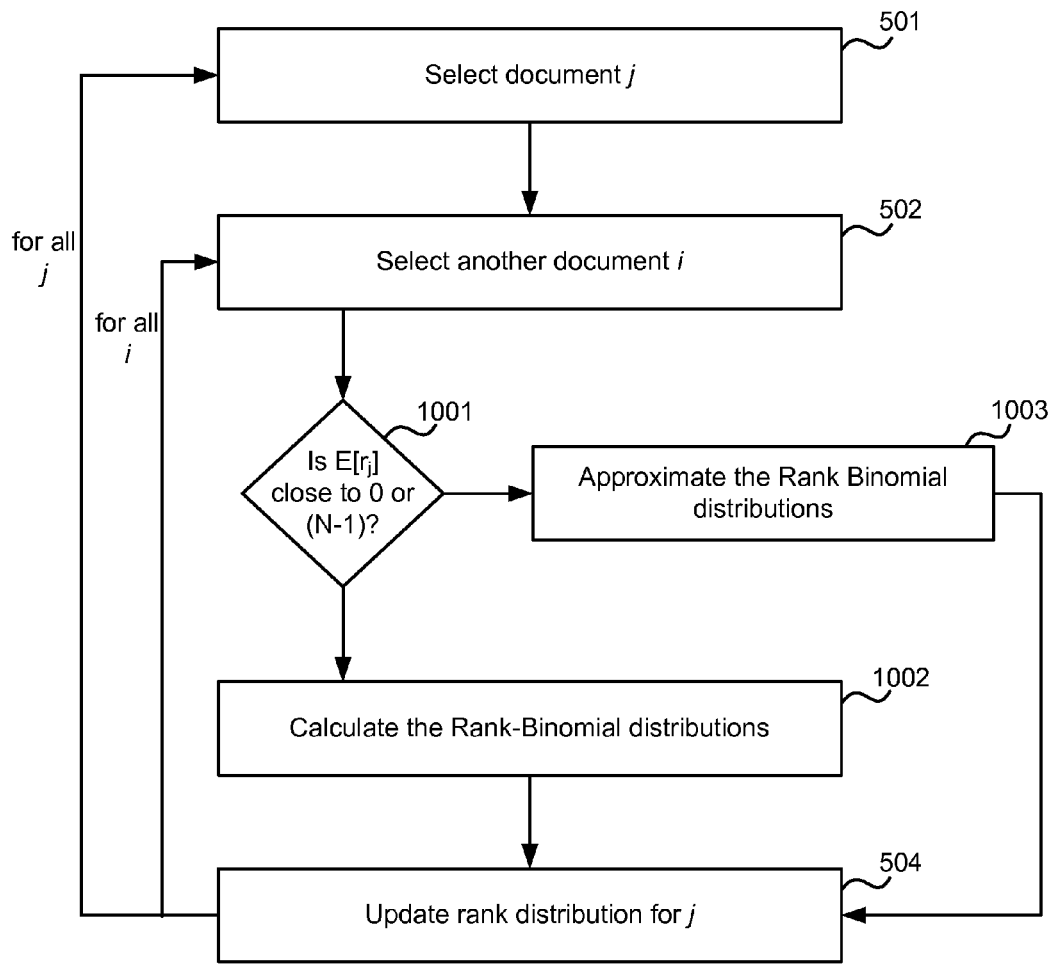
FIG. 10 is a flow diagram of an example method of computing rank distributions using an approximation.

FIG. 10 is a flow diagram of an example method of computing rank distributions using such an approximation. The expected rank, given by equation (4) is used to determine (in block 1001) whether the expected rank of the selected anchor document j is close to the top (rank 0) or bottom (rank N−1). Where it is determined that the anchor document is close to the top or bottom of the ranking (in block 1001), the approximation is not used (block 1002), whilst if the anchor document is not expected to be close to the top or bottom, the approximation is used (block 1003). The degree of 'closeness' used (in block 1001) may be set for the particular application (e.g. top 5 documents and bottom 5 documents, i.e. ranks 0-4 and (N−6)−(N−1) for this example).

Figure 11:
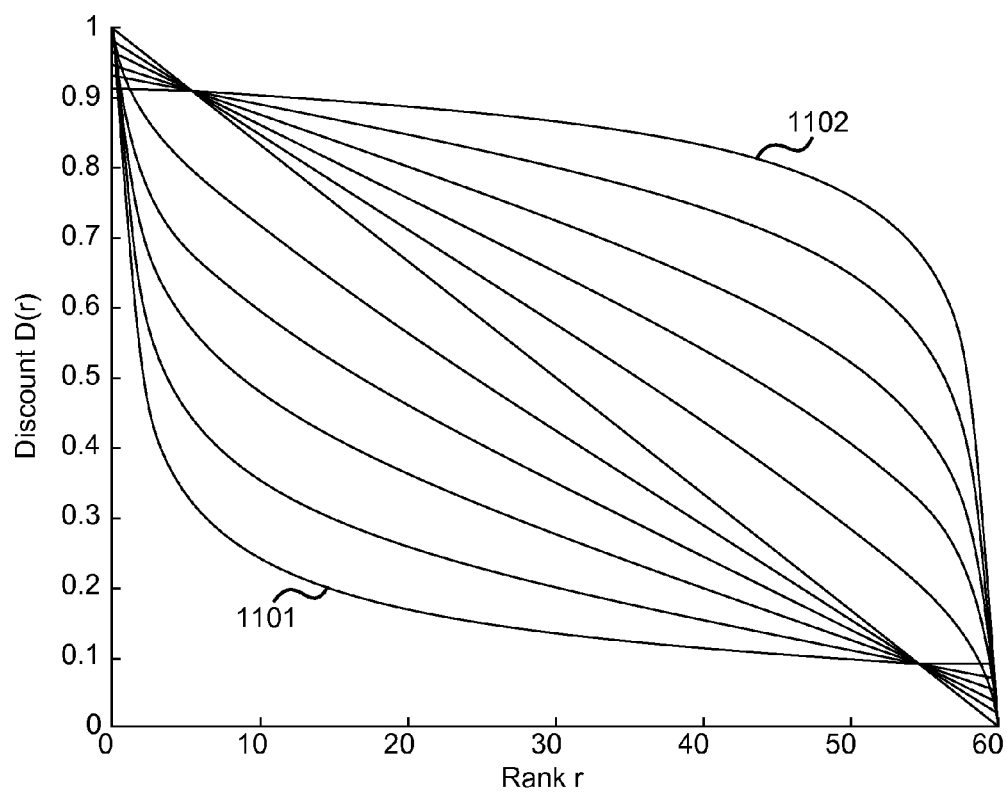
FIG. 11 shows a graph of a number of different training discount functions.

As described above, the NDCG discount function has the effect of concentrating on high-ranking documents (e.g. approximately the top 10 documents). In some implementations, however, a different discount function may be used for training purposes in order to exploit more of the training data (e.g. to also consider lower ranked documents). FIG. 11 shows a graph of a number of different training discount functions that do not decay as quickly as the regular NDCG discount function. These functions range from convex 1102 (super-linear with rank), through linear, to concave 1101 (sub-linear with rank, like the regular NDCG discount). These may be defined in terms of a discount parameter α, with the convex function denoted α=−1, linear denoted α=0 and concave denoted α=+1. Results showed optimum performance with a value of α=0.0 (i.e. a linear discount function, with D(r)=1−r(N−1)) and good performance with −0.4<α<+0.4.

The description above used a neural net as the model 10 by way of example. In another example, a Gaussian Process (GP) regression model may be used. The following is a summary of GPs for regression and more detail can be found in 'Gaussian Processes for Machine Learning' by Rasmussen and Williams (MIT Press, 2006). A Gaussian process defines a prior distribution over functions $f(x)$, such that any finite subset of function values $f=\{f_n\}_{n=1}^{N}$ is multivariate Gaussian distributed given the corresponding feature vectors $X=\{x_n\}_{n=1}^{N}$:

$$p(f|X) = N(f|0, K(X,X)) \quad (19)$$

The covariance matrix K(X,X) is constructed by evaluating a covariance or kernel function between all pairs of feature vectors: $K(X,X)_{ij} = K(x_i, x_j)$.

The covariance function K(x, x') expresses some general properties of the functions f(x) such as their smoothness, scale etc. It is usually a function of a number of hyperparameters θ which control aspects of these properties. A standard choice is the ARD+Linear kernel:

$$K(x_i, x_j) = c\exp\left[-\sum_{d=1}^{D}\frac{(x_i^{(d)} - x_j^{(d)})^2}{2\lambda_d^2}\right] + \sum_{d=1}^{D} w_d x_i^{(d)} x_j^{(d)} + w_0, \quad (20)$$

where $\theta = \{c, \lambda_1, \ldots, \lambda_D, w_0, \ldots, w_D\}$. This kernel allows for smoothly varying functions with linear trends. There is an individual lengthscale hyperparameter $\lambda_d$ for each input dimension, allowing each feature to have a differing effect on the regression.

In standard GP regression the actual observations $y=\{y_n\}_{n=1}^{N}$ are assumed to lie with Gaussian noise around the underlying function:

$$p(y_n|f_n)=N(y_n|f_n,\sigma^2) \quad (5)$$

Integrating out the latent function values we obtain the marginal likelihood:

$$p(y|X,\theta,\sigma^2)=N(y|0,K(X,X)+\sigma^2 I) \quad (21)$$

which is typically used to train the GP by finding a (local) maximum with respect to the hyperparameters $\theta$ and noise variance $\sigma^2$.

Prediction is made by considering a new input point x and conditioning on the observed data and hyperparameters. The distribution of the output value at the new point is then:

$$p(y|x,X,y) = N(y|0, \bar{s}(x), \sigma^2(x)) \quad (22)$$
$$\bar{s}(x) = K(x, X)[K(X, X) + \sigma^2 I]^{-1} y$$
$$\sigma^2(x) = \sigma^2 + K(x, x) - K(x, X)[K(X, X) + \sigma^2 I]^{-1} K(X, x)$$

where $K(x,X)$ is the kernel evaluated between the new input point and the N training inputs. The GP is a nonparametric model, because the training data are explicitly required at test time in order to construct the predictive distribution.

There are several ways in which Gaussian processes could be applied to ranking and the following example describes a combination of a GP model with the smoothed ranking training scheme (as described above).

The GP predictive mean and variance functions (as shown in equation (22)) are of exactly the right form to be used as the score means and uncertainties in equation (2) above:

$$p(s_j)=N(s_j|\bar{s}_j,\sigma_s^2)=N(s_j|f(w,x_j),\sigma_s^2) \quad (2)$$

The GP mean and variance functions, from equation (22), are regarded as parameterized functions to be optimized in the same way as the neural net in the methods described above.

Equation (22) shows that the regression outputs y can be made into virtual or prototype observations—they are free parameters to be optimized. This is because all training information enters through the NDCG objective, rather than directly as regression labels. In fact the corresponding set of input vectors X on which the GP predictions are based do not have to correspond to the actual training inputs, but can be a much smaller set of free inputs. To summarize, the mean and variance for the score of document j are given by:

$$\bar{s}(x_j) = K(x_j, X^u)[K(X^u, X^u) + \sigma^2 I]^{-1} y^u \quad (23)$$
$$\sigma^2(x_j) =$$
$$\sigma^2 + K(x_j, x_j) - K(x_j, X^u)[K(X^u, X^u) + \sigma^2 I]^{-1} K(X^u, x_j),$$

where $(X^u, y^u)$ is a small set of M prototype feature-vector/score pairs. These prototype points are free parameters that are optimized along with the hyperparameters $\theta$ using the SoftNDCG gradient training.

By using a small set of M prototypes this gives a sparse model, and reduces the training time from $O(N^3)$ to $O(NM^2 + NMD)$. If these prototypes are positioned well then they can mimic the effect of using all the training data.

To implement the SoftNDCG optimization, the $\pi_{ij}$ from equation (3) are now a function of both the score means and variances:

$$\pi_{ij} \equiv Pr(S_i - S_j > 0) = \int_0^\infty N(s|\bar{s}_i - \bar{s}_j, \sigma_i^2 + \sigma_j^2)ds. \quad (24)$$

Derivatives of $\bar{s}_j$ and $\sigma_j^2$ in equation 23 are also required with respect to prototypes $(X^u, y^u)$ and hyperparameters. For this the derivatives are first computed with respect to the kernel matrices of equation (23), and then the derivatives of the kernel function of equation (20) with respect to the prototypes and hyperparameters are computed. Splitting up the calculation in this way allows different kernels to be explored.

Figure 12:
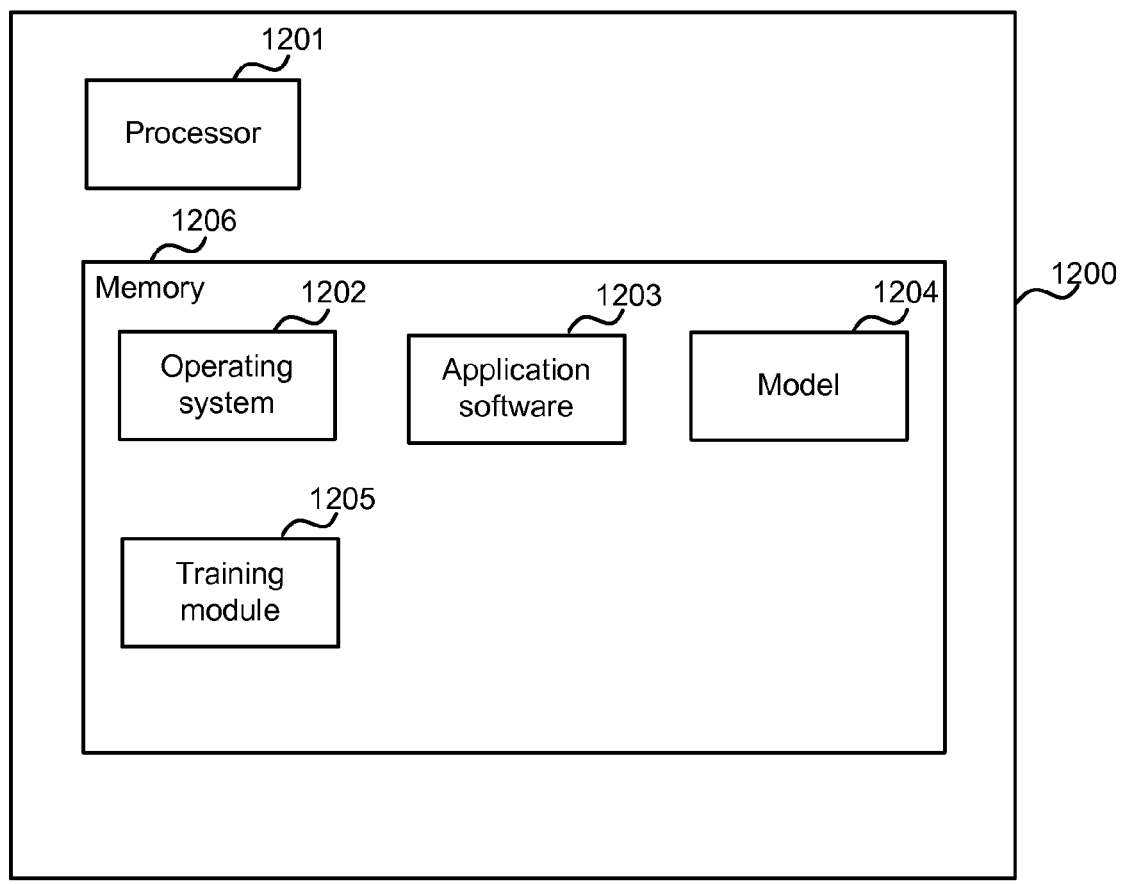
FIG. 12 illustrates an exemplary computing-based device in which embodiments of the methods described herein may be implemented.

FIG. 12 illustrates various components of an exemplary computing-based device 1200 which may be implemented as any form of a computing and/or electronic device, and in which embodiments of the methods described above may be implemented.

Computing-based device 1200 comprises one or more processors 1201 which may be microprocessors, controllers or any other suitable type of processors for processing computing executable instructions to control the operation of the device in order to generate score distributions and/or generate smoothed metrics, as described above. Platform software comprising an operating system 1202 or any other suitable platform software may be provided at the computing-based device to enable application software 1203-1205 to be executed on the device. The application software may comprise a model 1204 and a training module 1205.

The computer executable instructions may be provided using any computer-readable media, such as memory 1206. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

The computing-based device 1200 may further comprise one or more inputs which are of any suitable type for receiving media content, Internet Protocol (IP) input, etc, a communication interface and one or more outputs, such as an audio and/or video output to a display system integral with or in communication with the computing-based device. The display system may provide a graphical user interface, or other user interface of any suitable type.

Although the present examples are described and illustrated herein as being implemented in a system as shown in FIG. 12, the system described is provided as an example and not a limitation. As those skilled in the art will appreciate, the present examples are suitable for application in a variety of different types of computing systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
   selecting a first search object from a set of search objects;
   performing a pairwise comparison between the first search object and each other search object from the set of search objects to generate a rank distribution for the first search object,
   wherein the pairwise comparison is based on a score distribution for each of the set of search objects,
   wherein the rank distribution comprises a set of probabilities, each probability corresponding to the probability that the first search object has a particular rank; repeating the selection and pairwise comparison for each search object in the set of search objects to create a set of rank distributions, each corresponding to one of the set of search objects;
   generating a matrix comprising the set of rank distributions;
   converting the matrix into a doubly-Stochastic matrix;
   substituting the set of rank distributions into a Normalized Discounted Cumulative Gain to generate a smoothed information retrieval metric,
   wherein the smoothed information retrieval metric exhibits a substantially continuous change in value in response to changes in input parameters, the substituting comprising:
     rewriting the Normalized Discounted Cumulative Gain as a sum over search object indices;
     replacing a deterministic discount term with an expected discount based on the rank distributions, wherein the expected discount is obtained by mapping the rank distributions through the deterministic discount function; and
   training a machine learning model using the smoothed information retrieval metric as an objective function.

2. The computer-implemented method according to claim 1, further comprising:
   using an approximation to compute the pairwise comparison for a subset of the search objects.

3. The computer-implemented method according to claim 2, wherein the subset of search objects comprises more than half of the set of search objects.

4. The computer-implemented method according to claim 1, wherein performing a pairwise comparison comprises:
   selecting a second search object;
   determining a probability that the second search object ranks higher than the first search object based on score distributions for the first and second search objects; and
   updating a rank distribution for the first object based on the probability.

5. The computer-implemented method according to claim 1, further comprising: converting scores for each of the set of search objects into score distributions for each of the set of search objects.

6. The computer-implemented method according to claim 1, wherein the score distributions for each of the set of search objects is generated by a model.

7. A computer-implemented method of calculating an information retrieval metric comprising:
   replacing any deterministic scores with probabilistic score distributions; and
   computing an expectation of an information retrieval metric using the score distributions, the computing comprising:
     generating rank distributions for each search object using the probabilistic score distributions for each of a plurality of search objects; and
     computing the expectation of an information retrieval metric using the rank distributions for each search object, and
   wherein each score distribution corresponds to a search object and wherein the information retrieval metric using the score distributions exhibits a substantially continuous change in value in response to changes in input parameters.

8. One or more device-readable storage media storing instructions for performing steps comprising:
   generating a score distribution associated with each search object, the generating comprising:

accessing a deterministic score associated with each search object; and treating each deterministic score as a random variable;

identifying a first search object from a plurality of search objects as an anchor search object, each search object having an associated score distribution;

selecting each other search object from the plurality of search objects;

for each other search object in turn, determining a probability that the other search object has a higher score than the anchor search object, based on their associated score distributions;

updating a rank distribution for the anchor search object based on said probability;

repeating the steps with iteration identifying a different one of the plurality of search objects as an anchor search object;

generating a smoothed information retrieval metric using the rank distributions wherein the smoothed information retrieval metric exhibits a substantially continuous change in value in response to changes in input parameters; and inputting the smoothed information retrieval metric to a machine learning model as a training objective.

9. The one or more device-readable storage media according to claim 8, wherein the machine learning model is arranged to learn parameters for a ranking function for use in information retrieval.

\* \* \* \* \*